Figure 11:
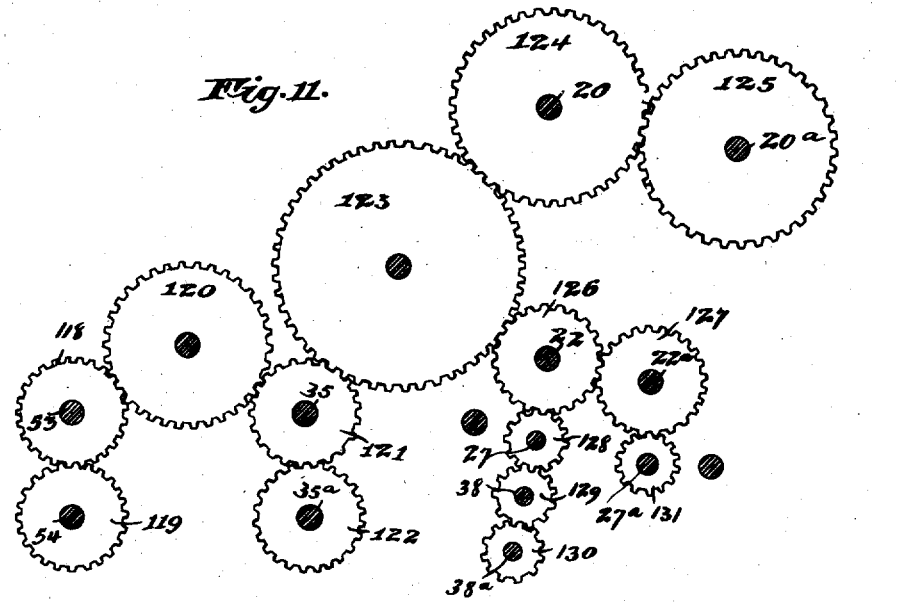

W. WEBSTER.
MACHINE FOR TREATING QUILL SUBSTANCES.
APPLICATION FILED OCT. 31, 1906.
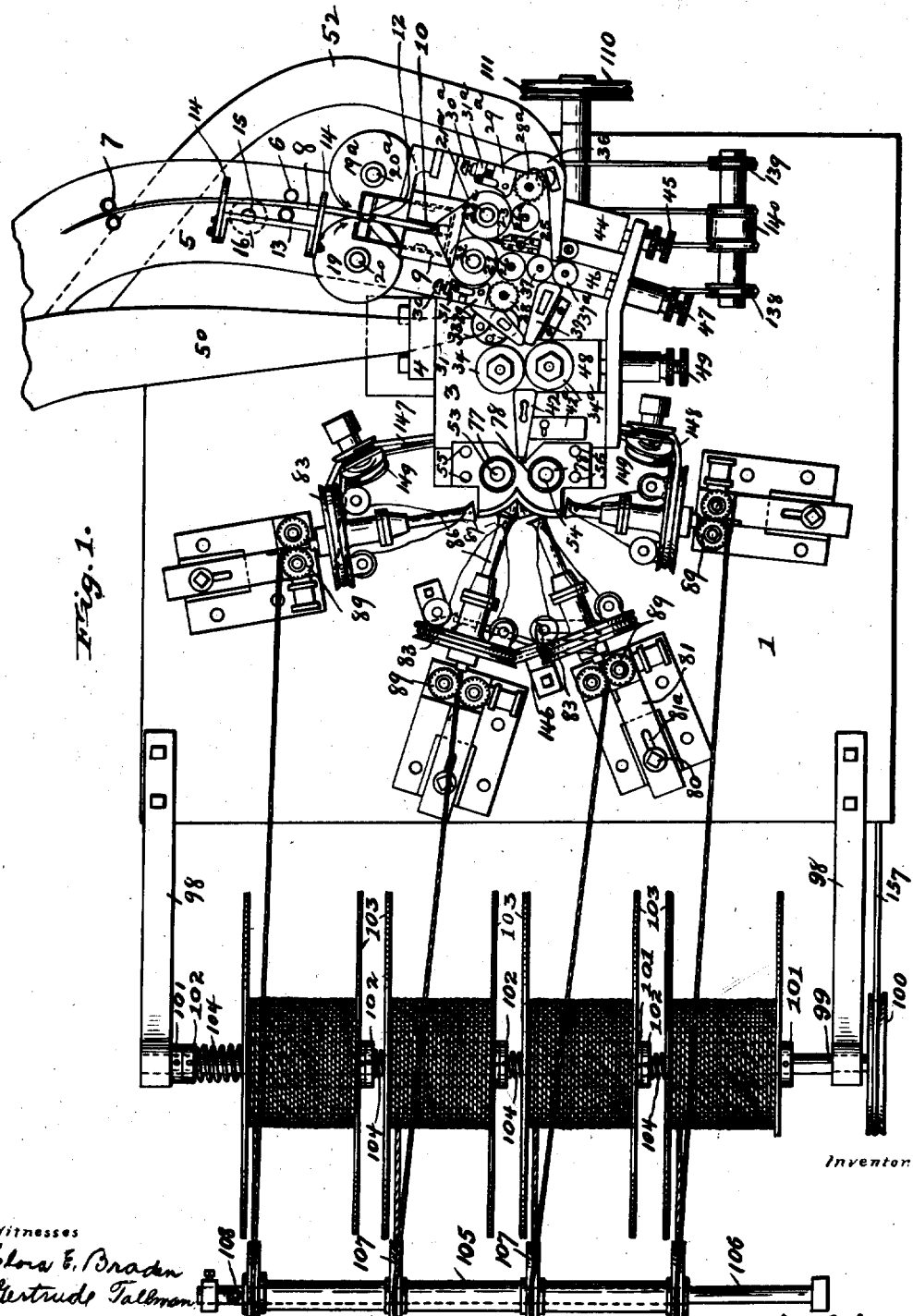

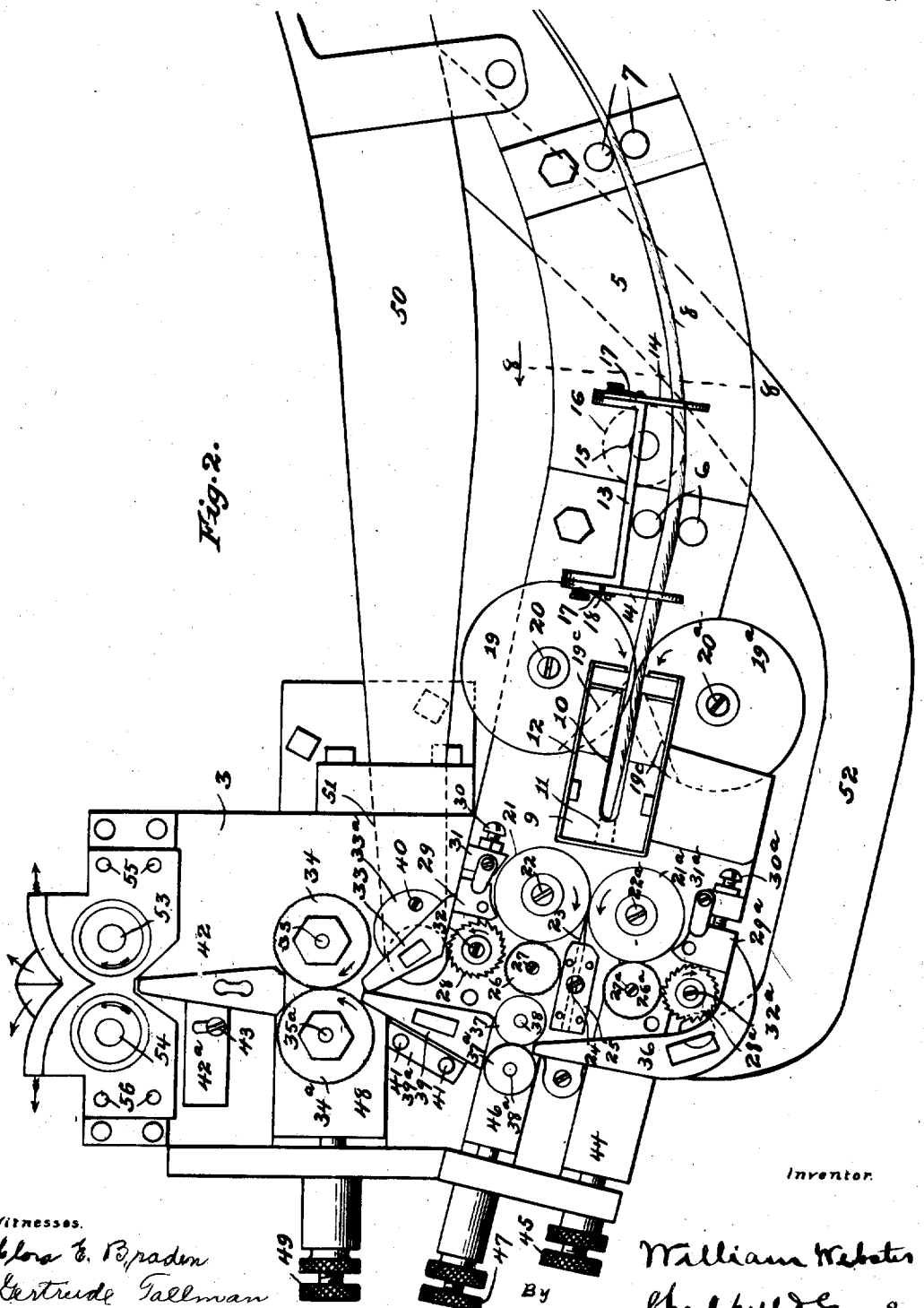

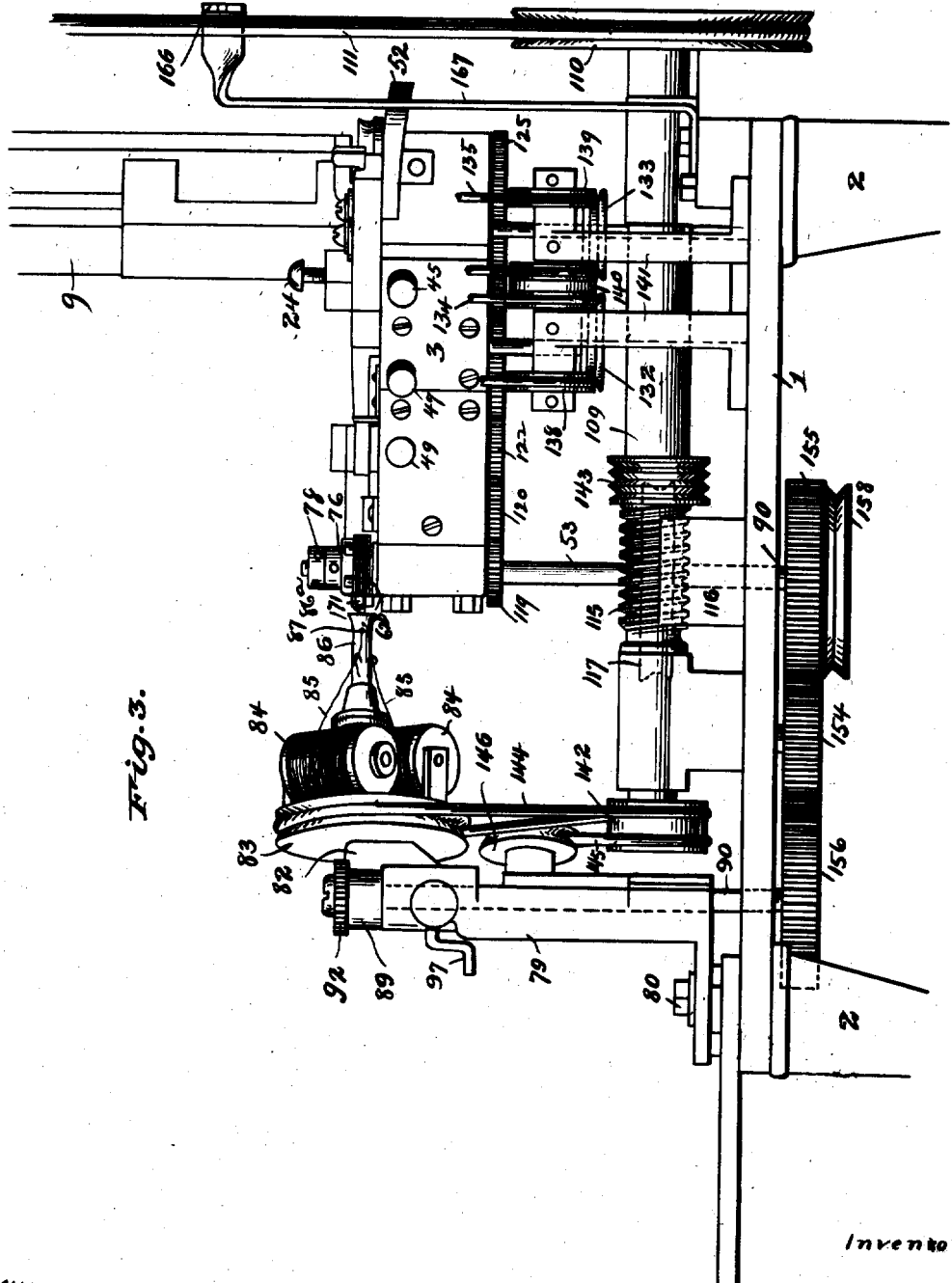

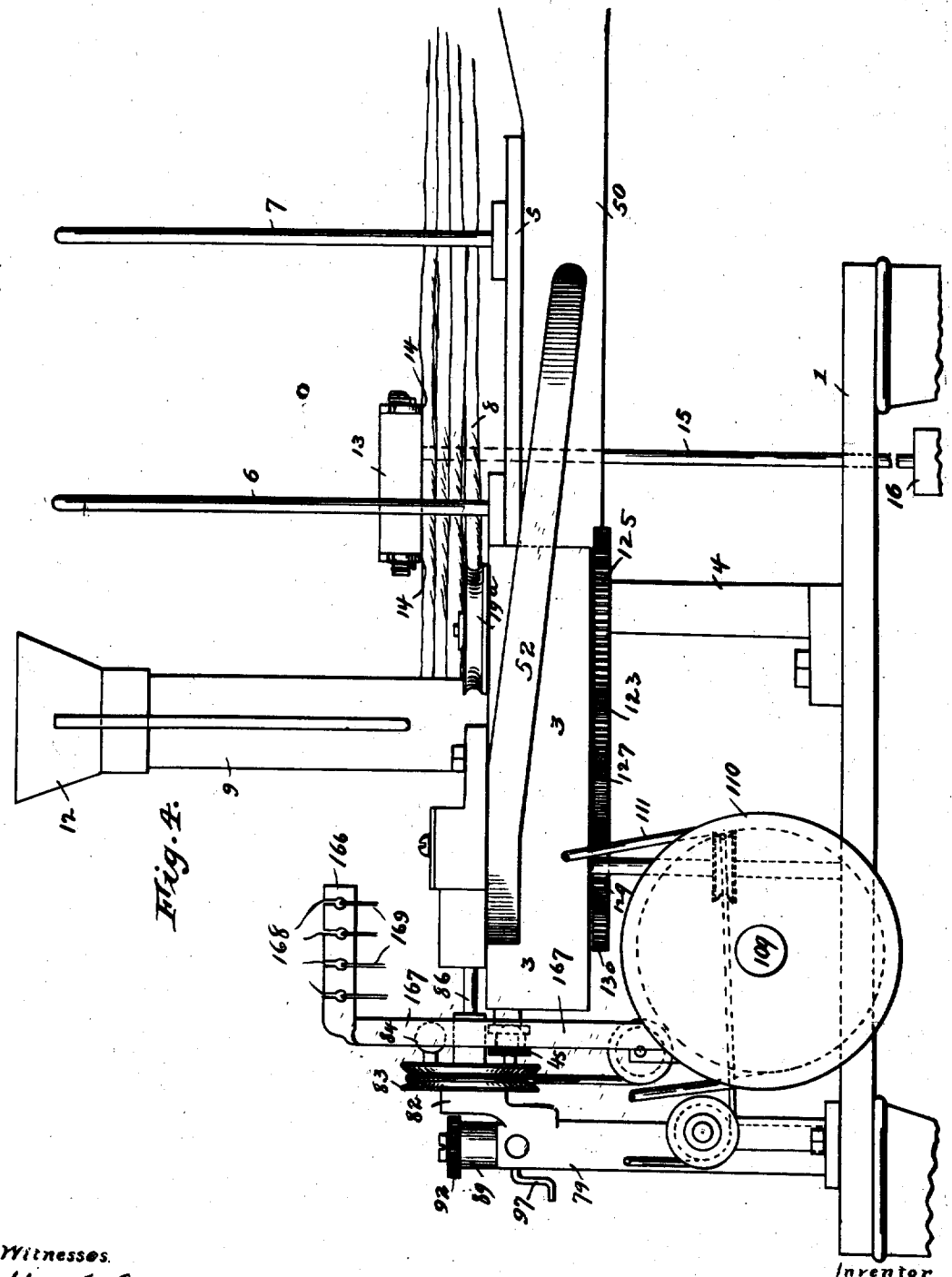

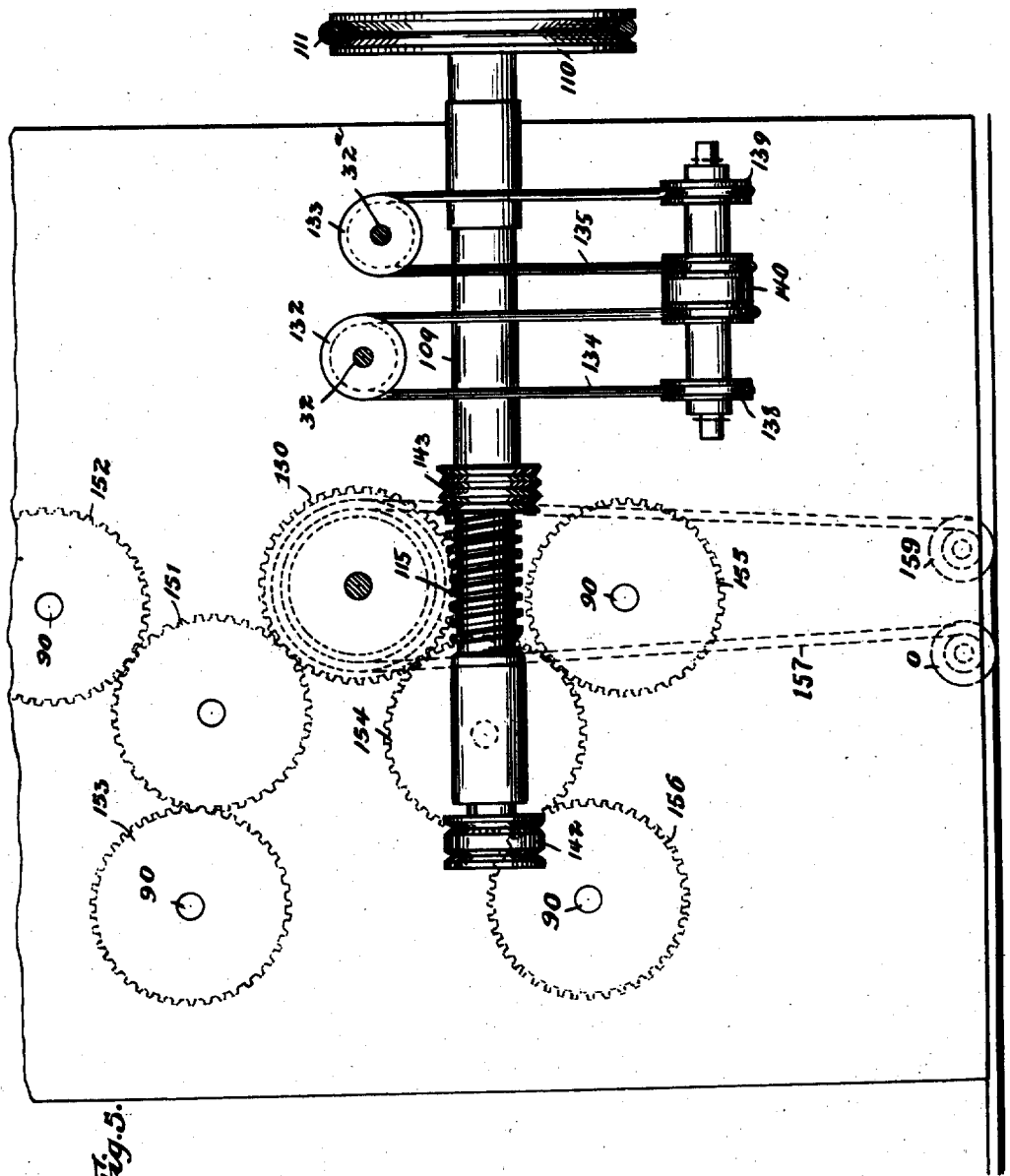

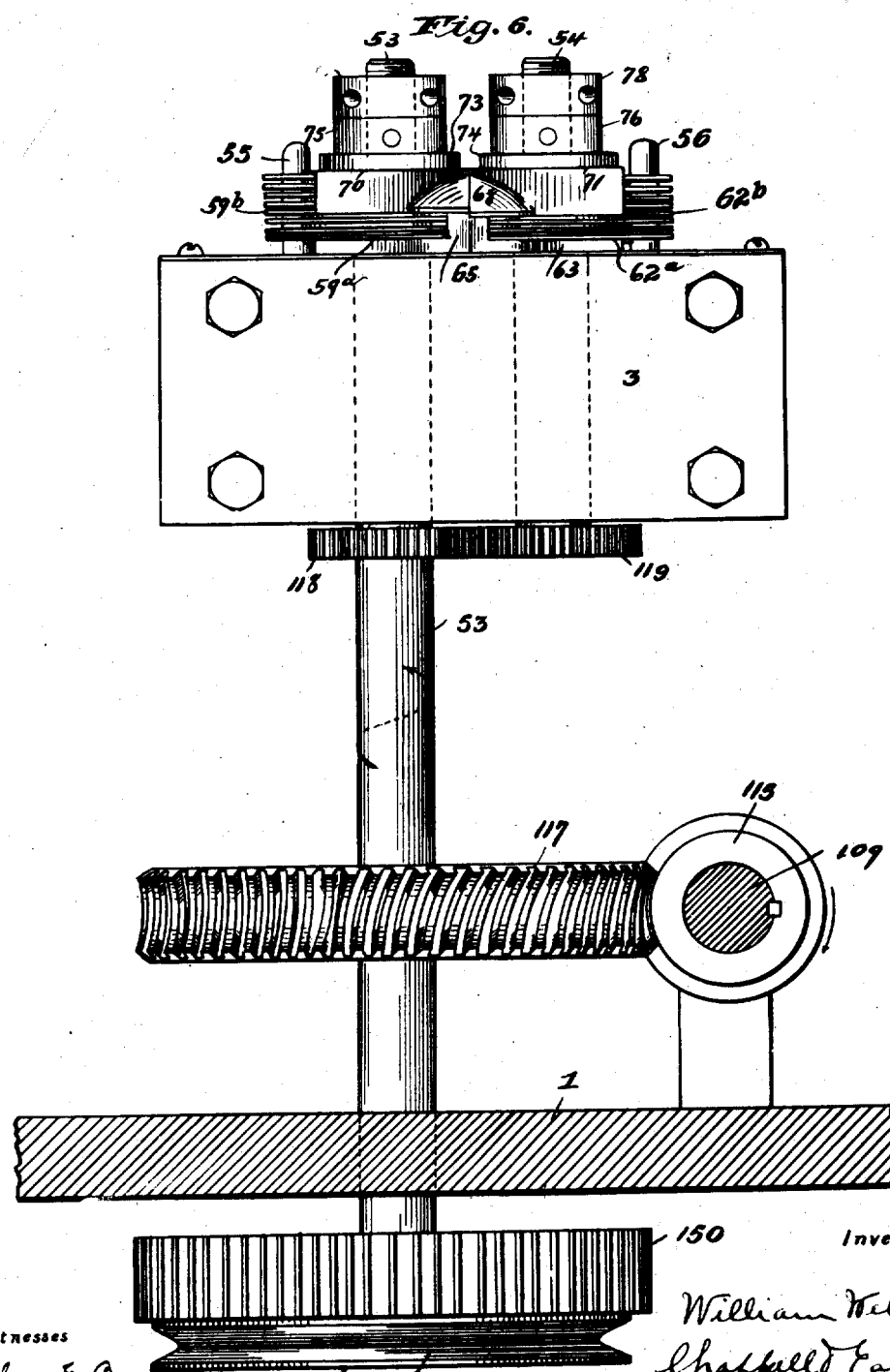

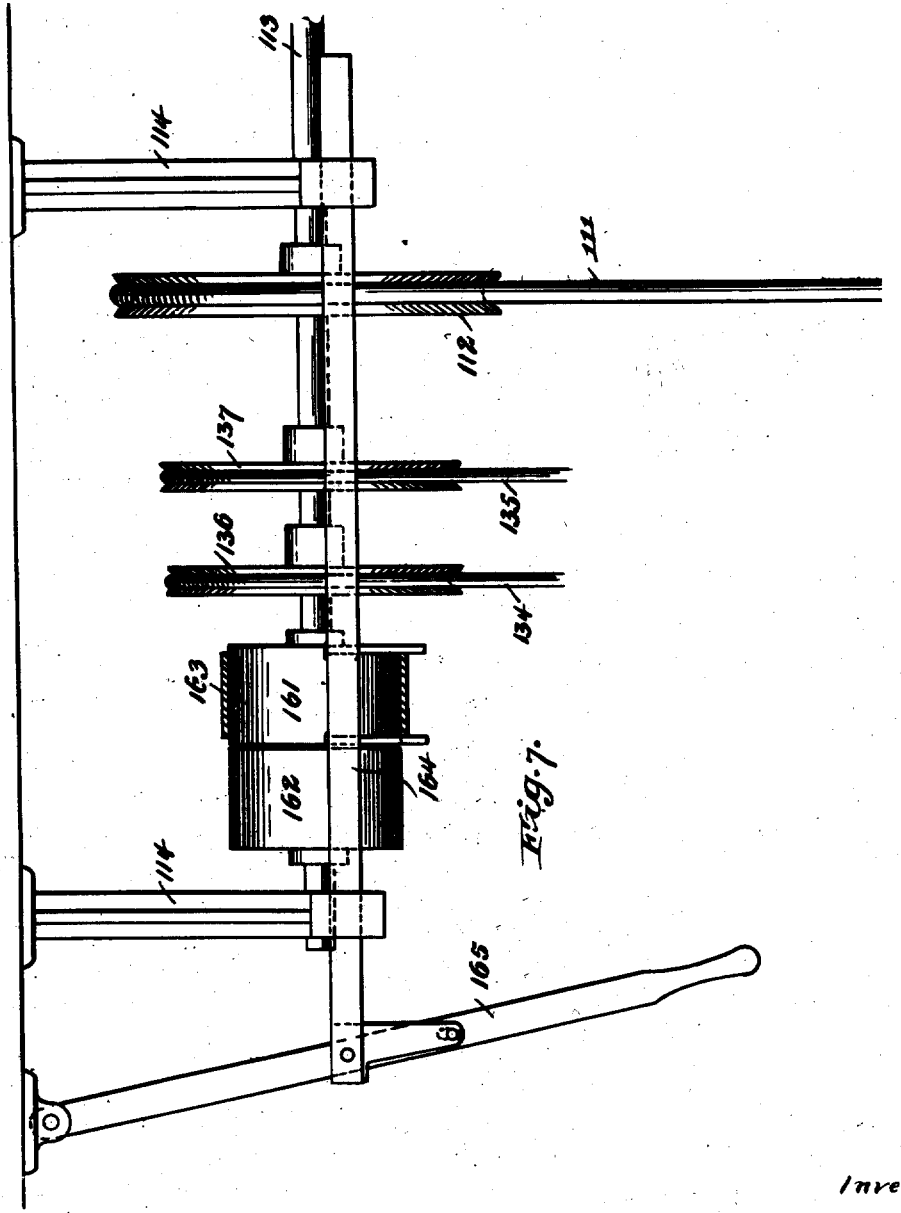

W. WEBSTER.
MACHINE FOR TREATING QUILL SUBSTANCES.
APPLICATION FILED OCT. 31, 1906.
900,048.
Patented Sept. 29, 1908.
11 SHEETS—SHEET 8.
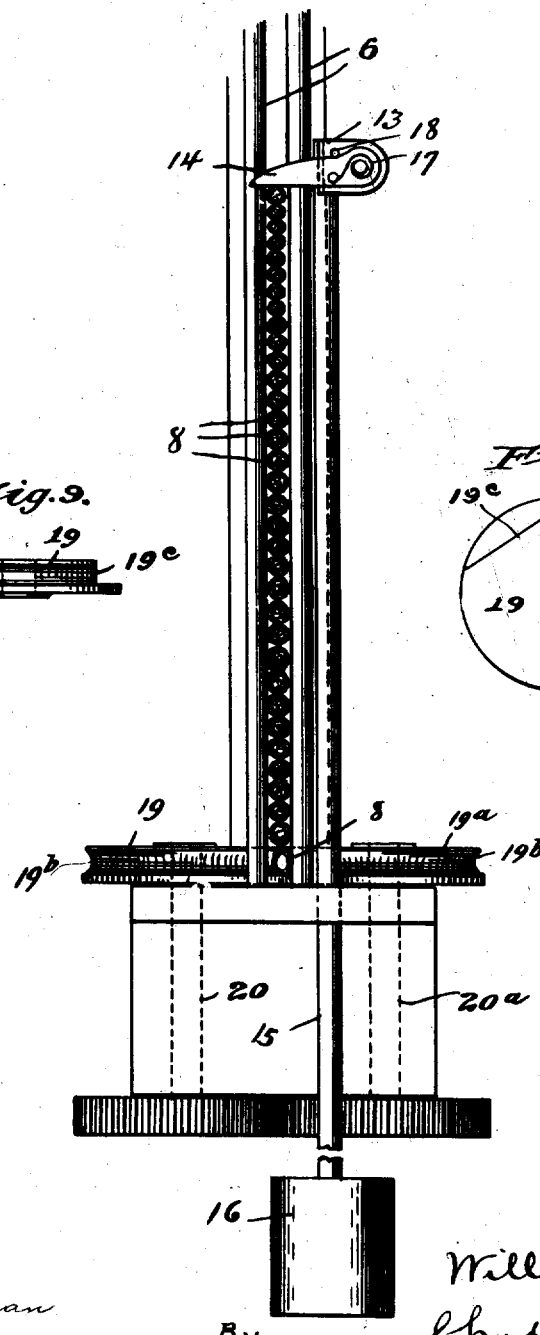

W. WEBSTER.
MACHINE FOR TREATING QUILL SUBSTANCES.
APPLICATION FILED OCT. 31, 1906.

900,048.

Patented Sept. 29, 1908.
11 SHEETS—SHEET 9.

Witnesses
Flora E. Braden
Gertrude Tallman

Inventor
William Webster
By Chappell & Earl
Attorneys

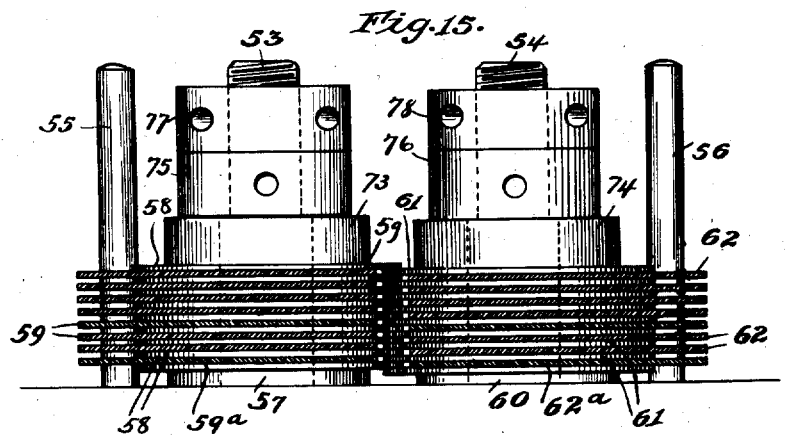
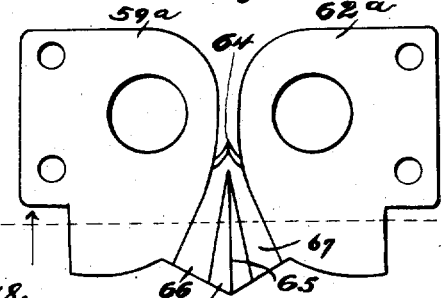
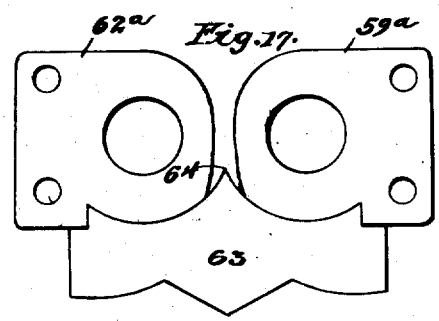

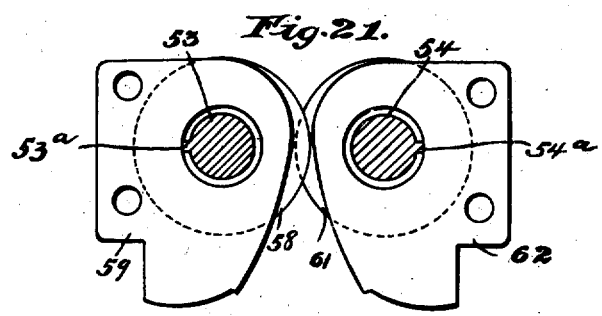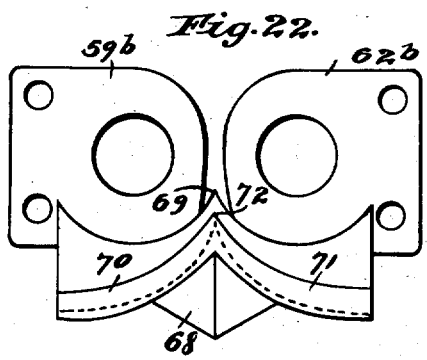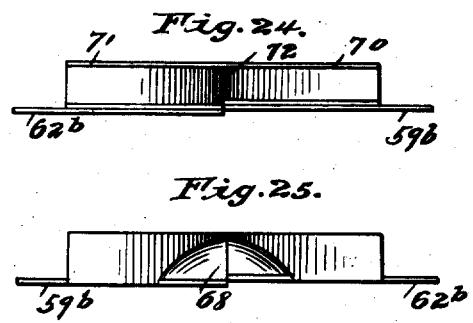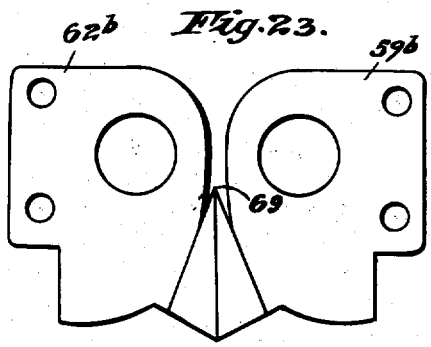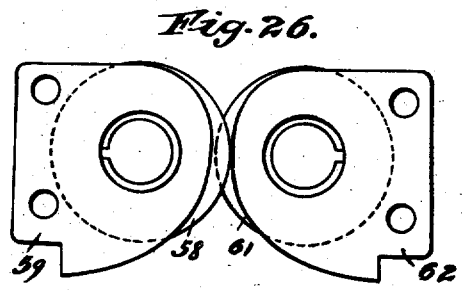

UNITED STATES PATENT OFFICE.

WILLIAM WEBSTER, OF LONDON, ONTARIO, CANADA, ASSIGNOR, BY MESNE ASSIGNMENTS, TO THE WARREN FEATHERBONE COMPANY OF MICHIGAN, OF THREE OAKS, MICHIGAN, A CORPORATION OF MICHIGAN.

MACHINE FOR TREATING QUILL SUBSTANCES.

No. 900,048.  Specification of Letters Patent.  Patented Sept. 29, 1908.

Original application filed November 14, 1904, Serial No. 232,757. Divided and this application filed October 31, 1906. Serial No. 341,499.

*To all whom it may concern:*

Be it known that I, WILLIAM WEBSTER, a subject of the King of Great Britain, residing at London, in the Province of Ontario, Canada, have invented certain new and useful Improvements in Machines for Treating Quill Substances, of which the following is a specification, this application being the result of a division in the application filed by me on November 14, 1904, Serial No. 232,757, for a patent for a machine for treating quill substances.

This invention relates to machines for treating quills in the manufacture of what is commercially known as "featherbone", a substance designed to fill the office of flexible resilient stays in connection with various classes of dress goods. In the preparation and manufacture of quills into articles of this nature, the quill is first split and then thoroughly stripped of its contained pith. Thereafter the longitudinal sections of the quill thus cleaned are "fibered": that is, further split longitudinally into a number of thin narrow slivers or fibers lying side by side, with the end portions of successive bunches of fibers overlapped and intermixed so as to create a continuous line of substantially uniform caliber, to which is applied a winding or covering of thread to mechanically bind the fibers together. Thereafter the strip thus created is immersed in a specially prepared glue or cement, and then dried, which imparts a uniformity of structure and strength, cohering all the parts together into a practically integral mass and at the same time preserving the natural elastic quality or resiliency of the original material. Thereafter the strip is often provided with a cloth or other covering, whereupon it is fitted to serve the general purposes of an elastic stay.

In the practical manufacture of this substance as at present carried out the splitting of the quills, the stripping of the pith therefrom, the fibering of the split and cleaned sections, and the wrapping or winding of the fibered quill have generally been performed by separate machines in separate and distinct operations, thus requiring the expenditure of considerable time and the services of a large number of operators in the practical manufacture of the substance on a considerable scale.

My present invention has for its general and principal object to facilitate the manufacture of the material described by combining the performance of the several operations hereinabove described in a single machine in which these several operations may be rapidly and successively carried out, whereby to economize in respect to both the time required for the manufacture of a given quantity of material and also in respect to the labor and expense therein.

Briefly stated, therefore, my invention may be said to reside in a machine for treating quills, wherein the splitting of the quills, the elimination of the pith, the fibering, and the wrapping or winding are all performed successively in the order named; the machine also including a mechanism for feeding the quills successively to the splitting mechanism, intermediate means for passing the quills on from one mechanism to the next, and mechanism for receiving and laying the wound product on suitable rollers or spools.

Figure 12:
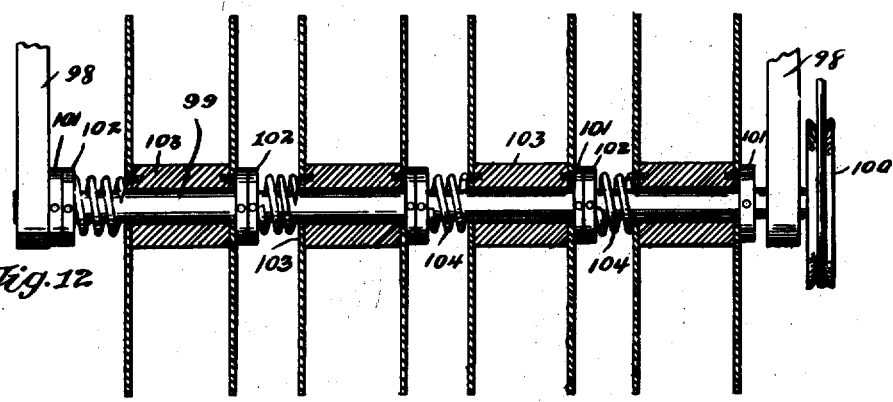
Figure 14:
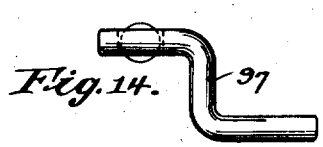
Figure 13:
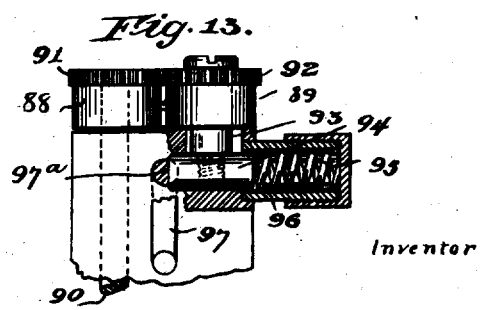

In the accompanying drawings I have illustrated a machine capable of carrying out the operations described and embodying my invention in the best mechanical form which I have thus far devised after numerous tests and experiments; and, referring thereto: Figure 1 is a top plan view of the complete machine; Fig. 2 is a similar view on an enlarged scale, with the winding and spooling mechanism omitted; Fig. 3 is a side elevational view of the machine, with the spooling mechanism omitted; Fig. 4 is a front elevational view of the machine; Fig. 5 is a top plan view of the main table or platform, showing the main shaft with parts of the driving mechanism of the pith-cutters and fibering devices above the same and a diagram of the underlying gears which actuate the feed-rolls of the winders; Fig. 6 is an enlarged detail view in front elevation of the fibering or slivering mechanism and the devices for actuating the same; Fig. 7 illustrates the side elevation, a convenient arrangement of overhead belt and pulley driving mechanism for imparting motion directly to the main shaft and the pith-cutter-shafts of the machine; Fig. 8 is an enlarged edge elevational view of the quill-feeding mechanism; Figs. 9 and 10 are detail edge and plan views of one of the duplicate peripherally-flattened quill-feeding disks constituting a part of the quill-feeding mechanism; Fig. 11 is a diagrammatic plan view of the intermeshing gears underlying the bed-plate of the machine and driving the rotating element of the superposed quill-feeding and fibering devices; Fig. 12 is a longitudinal sectional view through the spooling mechanism, illustrating the friction drive for the spools; Fig. 13 is a detail elevational view, partly in section, of the feeding mechanism of the winders; Fig. 14 is a detail side elevational view of the means for separating the feed-rolls of said winder-feed mechanism; Fig. 15 is a detail vertical sectional view through the fibering or slivering mechanism, with the cutters thereof appearing in edge elevation; Figs. 16, 17, 18 and 19 are, respectively, top plan, bottom plan, front edge and rear edge views of the lower partition-plate of the fibering mechanism; Fig. 20 is a cross-sectional view on the line 20—20 of Fig. 16; Fig. 21 is a top plan view of a pair of spacers and underlying cutters such as are employed between the lower partition-plate and the upper partition-plate; Figs. 22, 23, 24 and 25 are, respectively, top plan, bottom plan, front edge and rear edge views of the upper partition-plate of the fibering mechanism; and Fig. 26 is a top plan view corresponding to Fig. 21 of the spacers and underlying cutters employed above the upper partition-plate.

Before proceeding to a detail description of the machine, I will first briefly outline in a general way the organization of the machine, naming the several mechanisms and the order in which they coöperate. The entire mechanism is superposed upon a flat horizontal table or platform, the principal operating parts of the machine being carried by a bed-plate supported on suitable standards upon and above said table or platform. At one end of the supporting frame is mounted a quill-feeding mechanism from which the stripped quills are advanced, one at a time, upon a quill-splitting blade, whence the two halves of the quill are fed in opposite directions past a pair of rotary cutters which clean the inner surfaces of the quill sections of the pith. Thence the cleaned sections are advanced, one in a substantially direct line and the other by a roundabout course so as to cause them to overlap longitudinally, between a pair of feed-rolls and a longitudinal guide-channel to the action of a fibering or slivering mechanism which splits the quills longitudinally into a mass of fibers or slivers, and immediately thereafter divides the mass of fibers or slivers thus formed into a plurality of separate bundles which are led off independently into and through the throats or receiving tubes of a series of winders situated at different angles behind and converging toward the discharge side of the fibering mechanism. In these winders the several bundles of fibered stock are wound about by a suitable thread to bind them together into a continuous cord, the winders themselves being provided with feed-rolls which serve to draw the cords through the winders at a suitable rate of speed to effect the proper winding. From the winders the wound cords pass rearwardly of the machine over a reciprocating guiding mechanism to and around a series of receiving-spools on which they are wound in successive layers.

Proceeding now to a detailed description of the machine and of the several coöperating mechanisms of which it is composed, 1 designates a rectangular horizontal table or platform supported at its four corners on legs 2. 3 designates a horizontal bed-plate supported upon and above the table 1 on standards 4, most of which are omitted from the drawings for the sake of greater clearness.

Describing first the quill-supporting and feeding mechanism: 5 designates a horizontal lateral extension of the bed-plate 3 from which rise at longitudinally-separated points pairs of inner and outer guide-rods 6 and 7, respectively, the two rods of each pair being spaced sufficiently to receive between them a stack made up of a series of superposed stripped quills 8. Inwardly of the guides 6 there rises from the bed-plate a post 9 which has a deep longitudinal groove 10 on that side adjacent to the guides 6, the lower end of which groove is continued through the post in the form of a feed-slot 11 of sufficient size to admit the passage therethrough of the lowermost of the series of quills. The post 9 is preferably surmounted by a removable guide-hopper 12 having outwardly-flaring walls adapted to readily receive and guide into the vertical groove of the post the advance or blunt ends of the quills. From the foregoing it will be seen that the stack of quills is supported and guided at its inner end by the grooved post 9 and intermediate its length by the inner and outer guide-posts 6 and 7. In order to effect the downward feed of the individual quills of the stack as fast as each lowermost quill is withdrawn, I employ means for maintaining a constant downward pressure on the stack of quills, the means herein shown for this purpose consisting of a bar 13 disposed behind the stack and having pivoted to the ends thereof fingers 14 which overlie the upper quill crosswise thereof, to which bar is secured a depending rod 15, passing through and guided in the bed-plate extension 5 and platform 1, and terminating in a weight 16. In order to make the bar 13 readily retractible past a fresh stack of quills, the fingers 14 are normally spring-pressed downwardly or inwardly toward the plane of the bar 13 by springs 17, their movement in the opposite direction under the action of the weight resisted by the quills being limited by stop-pins 18 (Figs. 2 and 8). This construction enables a fresh stack of quills to be loaded into the quill-holder and the quill-depressing-bar to be subsequently raised and engaged with the uppermost quill, the rounded upper edges of the fingers 14 riding idly against the inner sides of the quills during such upward movement.

Describing next the mechanism for feeding forward into the machine the successive quills of the stack as fast as each assumes the lowermost position: 19 and 19$^a$ designate a pair of duplicate feed-rolls that are mounted in the same horizontal plane on the upper ends of shafts 20 and 20$^a$ journaled vertically in the bed-plate 3. These disks, as more particularly shown in Figs. 8, 9 and 10, are provided with fluted peripheries 19$^b$, and each has a portion of such grooved periphery cut away or flattened, as shown at 19$^c$. These disks are so positioned in the horizontal plane of the feed-slot or throat 11 that the lines of their maximum peripheries coincide or contact in the path of movement of the lowermost quill, as clearly shown in Fig. 2, whereby as rear ends of the flattened portions 19$^c$ come together upon the quill, the latter is clamped between the grooved peripheries of said disks and advanced thereby until the other ends of the flattened portions coincide, thus bringing said flattened portions opposite each other and releasing the tail of the quill.

From the slot or throat 11, the nose of the quill enters the grip of a pair of feed-rolls 21, 21$^a$, mounted in the same horizontal plane on the upper surface of the bed-plate 3, said rolls being keyed on the upper ends of a pair of vertical shafts 22, 22$^a$, mounted in the bed-plate 3. From the grip of said rolls the quill passes directly upon the point of a knife-blade 23 adjustably held by a set-screw 24 in a supporting-block 25 so as to lie longitudinally of the advancing quill and centrally of its path of movement, whereby the quill is split longitudinally into halves. One of these halves, making a turn of substantially a right angle to the right, is engaged by and fed between the feed-roll 21 and a companion feed-roll 26 keyed on the upper end of a shaft 27 vertically journaled in the bed-plate 3, whence it passes between the periphery of a rotary cutter-head 28 and a guide-block 29 opposite the periphery of said cutter and adjustable toward and from the latter by a set-screw 30 mounted in a fixed block 31 and engaging the guide-block 29. The rotary cutter-head 28 is keyed on the upper end of a shaft 32 journaled vertically in the bed-plate 3. On the opposite side of the knife 23 is a feed-disk 26$^a$ mounted on a vertical shaft 27$^a$ and coöperating with the feed-disk 21$^a$ to carry forward the left-hand half of the split quill into the field of action of a rotary cutter-head 28$^a$ mounted on a vertical shaft 32$^a$ and coöperating with a guide block 29$^a$ toward and from the periphery of the cutter by means of set-screw 30$^a$ mounted in the stationary guide-block 31$^a$. The parts 21 to 32 and 21$^a$ to 32$^a$, respectively, hereinabove described, are duplicates and perform similar operations upon the split halves of the quill, their function being to advance the latter and thoroughly clean it of its contained pith by the action of the cutters 28 and 28$^a$. The directions of rotation of the cutter-disks are indicated by the arrows placed thereon, from which it will be seen that the quill-engaging portion of each cutter travels in the same direction as the quill itself, the cutting-disks being provided with oblique peripheral teeth which effectually eat out the body of pith contained in each half of the quill.

From the pith-cutter 28 the cleaned half of the quill passes through a tubular guide-channel 33 to the nip of another pair of peripherally-milled corrugated feed-rolls 34 and 34$^a$ keyed on the upper ends of shafts 35 and 35$^a$, respectively, rotatably mounted in the bed-plate 3; and from the rotary pith-cutter 28$^a$ the other half of the cleaned quill advances through a curved tubular guide 36 between a pair of forwarding feed-rolls 37 and 37$^a$ keyed on the upper ends of shafts 38 and 38$^a$, whence it is passed through another tubular guide 39 so disposed relatively to the companion guide 33 as to form with the latter convergent paths for the two halves of the cleaned quills which emerge at the discharging ends of the guides opposite the nip of the said feed-rolls 34 and 34$^a$. The tubular guides 33 and 39 are preferably secured to the bed-plate 3 in a manner to render them capable of accurate positioning relatively to each other and to the parts which they connect by means of base flanges 33$^a$ and 39$^a$ extending laterally therefrom and secured to the base-plate as by screws 40 and 41, respectively. The two cleaned halves of the quill, which meet at the convergent end of the channel-guides 33 and 39, pass thence, one partially in advance of the other, into and through a further tubular guide 42 located beyond the feed-rolls 34 and 34$^a$ with its longitudinal axis substantially tangential to the contacting peripheries of said feed-rolls. The guide 42 is adjustably secured to the bed-plate by means of a slotted laterally-projecting base-flange 42$^a$ through which passes a set-screw 43. One roll of each of the several pairs of feed-rolls above described is preferably mounted in an adjustable bearing-block set in and constituting essentially a part of the main bed-plate of the machine, for the purpose of nicely adjusting the spacing of the companion rolls of each pair and their grip on the stock passed between them. For instance, the roll 26ᵃ is mounted in a block 44 rendered adjustable toward and from the companion roll 21ᵃ by an adjusting screw 45. The rolls 37ᵃ and 26 are mounted in a similar bearing-block 46 rendered adjustable toward and from the companion rolls 37 and 21, respectively, by an adjusting screw 47; and, similarly, feed-roll 34ᵃ is mounted in a bearing-block 48 adjustable horizontally toward and from the companion roll 34 by means of an adjusting screw 49.

In order to prevent clogging of the operating parts by the excised material represented chiefly by the removed pith, I preferably provide means adjacent to the pith-cutters 28 and 28ᵃ for producing a suction effect for the removal of such waste material as fast as it is separated from the shell. The means herein shown for this purpose consists of a suction-tube 50 connected at one end with a suitable exhaust-fan (not shown) and at its other end with the outer end of a channel 51 cored in the bed-plate 3 and terminating in the space immediately adjacent to the cutter 28. From the space immediately surrounding the periphery of the companion cutter 28ᵃ a branch suction-duct 52 leads around and beneath the front portion of the machine to a junction with the main suction conduit 50, all as clearly shown in Fig. 2. A constant suction being maintained through the pipes 50 and 52, the chips and dust are drawn away as fast as formed.

From the guide 42 the split quills pass to the action of the fibering mechanism which splits the quills longitudinally into a mass of slivers or fibers which, as they emerge from this mechanism, are divided into a plurality of bundles each of which is led away separately to and through a mechanism which wraps a thread therearound to bind them into a continuous cord. This fibering mechanism consists, generally speaking, of two stacks of superposed rotary cutting disks separated by alternate stationary washers which serve the double function of spacing the cutting disks so that the edges of one series slightly overlap the proximate edges of the other series and of cleaning the cutting-disks and preventing the accumulation of fine particles of the material therebetween. The construction of this mechanism will be readily understood by reference to the detail views, Figs. 15 to 26, inclusive, wherein 53 and 54 designate a pair of vertical shafts rotatably mounted in the bed 3 beyond and to either side of the discharge end of the guide 42, said shafts having keys 53ᵃ and 54ᵃ, respectively. To either side of said shafts are mounted in the bed pairs of posts 55 and 56, respectively. On the shaft 53 is mounted, first, a washer 57, and above the same a series of alternately disposed circular cutting-disks 58 and spacers or cleaners 59. On the companion shaft 54 is mounted, first, a washer 60, and above the latter a corresponding series of alternately-disposed cutter-disks 61 and spacers or cleaners 62. Directly above the lowermost cutters on the shafts 53 and 54 is mounted what I term the lower partition-plate, the same being shown in detail in Figs. 16 to 20, inclusive. This member consists of a pair of symmetrical flat wings 59ᵃ and 62ᵃ, which correspond in form and function to the spacers 59 and 62, connected by a bridge 63. The lower flat side of the bridge has the form shown in bottom plan in Fig. 17, having a forwardly or inwardly-extending point 64 which lies between the adjacent sides of the wings 59ᵃ and 62ᵃ. The bridge also has on its upper surface an upstanding narrow V-shaped wall 65, thereby creating a pair of outwardly-divergent channels 66 and 67. It will be observed by reference to Figs. 18, 19 and 20 that the wing 62ᵃ is mounted the thickness of one of the cutter-disks lower than the plane of the companion wing 59ᵃ. This is in accordance with the general arrangement of the cutters and spacers throughout the stack, wherein the cutters on one side lie in the horizontal planes of the spacers on the other, thus allowing the overlapping of the adjacent edges of the cutter-disks.

At substantially mid-height of the stack is interposed what I term the upper partition-plate. This is shown in detail in Figs. 22 to 25, inclusive, and consists, like the lower partition-plate, of a pair of symmetrically-disposed wings 59ᵇ and 62ᵇ, connected by a bridge 68. The form and construction of this latter is here illustrated in top plan in Fig. 22 and in bottom plan in Fig. 23, wherein it will be seen that this bridge also has a sharp inwardly-extending point 69 lying between the adjacent sides of the wings 59ᵇ and 62ᵇ. The formation of the under side of this plate adapts it to seat directly upon the upper surface of the wall 65 of the lower partition-plate, while its upper surface is formed to present a pair of outwardly-divergent channel-guides 70 and 71 leading off from the apex 72 of a vertical dividing wall constituting the upright walls of the channels 70 and 71. The several cutting-disks 58 and 61 are keyed on the shafts 53 and 54, respectively, and rotate therewith; while the spacing-washers, as also the wings of the lower and upper partition-plates, are provided with apertures by which they fit over the posts 55 and 56, as well as with central apertures sufficiently large to fit over the shafts 53 and 54 and the key-feathers thereon, from which it will be understood that the spacers and partition-plates are held against rotation. Comparatively thick washers 73 and 74 overlie the two stacks of cutters, respectively, which latter are clamped with the requisite pressure to insure a clean shearing action between the coöperating edges of the cutting-disks by nuts 75 and 76 retained by locking-nuts 77 and 78, respectively, screwed down on the upper ends of the shafts 53 and 54. From the foregoing, it will be seen that the upper surface of the base-plate of the bridge 63, in association with the wall 65 on one side and the edges of the interposed spacers and wings of the lower partition-plate make up the confining walls of the intermediate channels 66 and 67 which divide vertically and guide off in two horizontally-divergent sections substantially the lower half of the fibered or slivered stock delivered by the fibering mechanism; while the corresponding elements of the bridge 68 of the upper partition-plate, in association with the inwardly-adjacent edges of the superposed spacers make up the widely divergent channels which divide vertically the upper half of the fibered stock and guide the separated portions away in substantially opposite directions.

From the fibering mechanism last described the divided sections of the fibered stock pass off to and through a series of winders which wind about them a binding cord or thread. These winders, which are duplicates of each other, and are positioned on the table 1, at suitable relative angles to receive the several sections, are each mounted on a post 79 secured at its base by the clamping-bolt 80 operating in a slot 81ª of a horizontal foot 81 in such a manner as to be adjustable in the direction of its length toward and from the fibering mechanism. The post 79 has rotatably mounted on a tubular shaft projecting inwardly from a bracket 82 connected to its upper end a pulley 83, on the inner face of which are mounted spools 84 carrying the winding thread 85. Attached to the inner face of each pulley 83 concentrically therewith and in alinement with its tubular shaft is an inwardly projecting tube 86 which extends into close proximity to the several discharging channels of the fibering mechanism, being preferably outwardly-flared or enlarged at their inner ends as shown at 86ª to facilitate the entrance of the stock to be wound. The threads 85 from the spools are threaded through small holes 87 in the tube 86 just in rear of the enlargement 86ª thereof. On the upper end of the post 79 is mounted, side by side, a pair of gripping and feeding rolls 88 and 89 (Fig. 13), the function of which is to grip the wound cord, draw it through the winders and pass it on to the receiving-reels. One of these rolls (88 as herein shown) is fast on the upper end of a shaft 90 rotatably mounted in the head of the post 79, said shaft extending downwardly through a bearing in the table 1 (Fig. 3). The roll 88 carries on its upper end a small gear 91 which meshes with a small gear 92 on the companion roll 89 and drives the latter. In order to separate said rolls, when desired, the roll 89 is made adjustable toward and from its companion driving roll 88 by being mounted on a short vertical shaft 93 that is set in a horizontally-slidable block 94 inwardly pressed by a spring 95 carried in a laterally-projecting casing 96. To force the block 94 outwardly a small crank-arm 97 (Fig. 14) is mounted in the head of the post opposite the inner end of the block 94 and provided with a flattened side 97ª bearing against the latter. By giving the crank-arm 97 a quarter turn the block 94 is forced outwardly in an obvious manner, thus separating the rolls.

From the winders the wound strips may be carried to and received upon any suitable receiving-reels or spools, the mechanism herein shown for this purpose being as follows: In a pair of bracket-arms 98 secured to and extending rearwardly from the table 1 is journaled a reel-shaft 99 (Fig. 12), carrying on one overhanging end a grooved pulley 100 by which it is driven. Keyed on this shaft are a series of friction-disks 101 and 102; and loosely mounted on the same, between said disks, are a series of receiving-spools 103. One head of each spool is crowded against the respective disks 101 by means of a coil-spring 104 which at one end thrusts against the other head of the spool, its opposite end having an adjustable abutment against the disk 102, whereby the thrust of the spring may be regulated to secure the required frictional effect between the opposite head of the spool and its coöperating friction driving-disk 101. By adjusting the tension of the springs 104 the required degree of drag may be imparted to the spools to create such a tension on the strips wound thereon as will serve to lay the material in close and compact order, yet without danger of interrupting the continuity of the strip at any stage in its passage through the machine. In order to lay the strips in close and uniform coils I have shown merely a well-known type of coiling mechanism consisting of a sleeve 105 slidable longitudinally on a rod 106 supported parallel with and beyond the receiving-spools; this sleeve carrying a series of grooved pulleys 107, one for each spool over which the wound strips are passed, and having at one end the usual tongue 108 that rides back and forth in a right and left hand thread formed on one end of the shaft 106.

Thus far I have described the various mechanisms and instrumentalities that perform the successive operations upon the material treated, transforming it from stripped quills at the start to continuous uniform cords of the fibered shells of the quills. I will now briefly describe the mechanism by which the several operating parts already described are given their respective movements and caused to perform their respective functions in the operation of the machine.

Referring first to Figs. 3, 5, and 7, horizontally journaled upon the table 1 and beneath the bed 3 is the main driving shaft of the machine, designated by 109, which shaft carries on its overhanging end a grooved pulley 110 receiving motion from a belt 111 herein shown as driven from a pulley 112 on an overhead shaft 113 suspended by hangers 114 from the ceiling. This shaft 109 has formed thereon a worm 115 running upon an oil-tablet or cushion 116 and meshing with a worm-wheel 117 (Fig. 6) fast on the shaft 53 of the fibering mechanism, whereby the left-hand set of cutters is positively driven. A master-gear 118, also fast on the shaft 53, meshes with and drives a companion gear 119 on the lower end of the shaft 54, whereby the right-hand set of cutters is driven at the same rate of speed and in the opposite direction to the rotation of the left-hand set of cutters. Referring next particularly to Figs. 11 and 2, the former of which shows in diagram the gears underlying the bed 3 and driving the various movable parts mounted above said bed shown in Fig. 2, the gear 118 drives an idler-gear 120 which, in turn, drives a gear 121 on the lower end of the shaft 35 of the feed-roll 34. Gear 121 drives a companion gear 122 on the lower end of the shaft 35ª of the companion feed-roll 34ª, and it also drives a larger idler 123, which drives a gear 124 on the lower end of the shaft 20 of the flattened quill-feeding disk 19, gear 124 driving a companion gear 125 on the lower end of the shaft 20ª of the companion quill-feeding disk 19ª. The idler-gear 123 also drives a gear 126 on the lower end of the shaft 22 of the feed-roll 21, and the gear 126 drives a companion gear 127 on the lower end of shaft 22ª of the companion feed-disk 21ª. Three small intermeshing gears 128, 129 and 130, on the lower ends of feed-roll shafts 27, 38 and 38ª, respectively, drive the several feed-rolls 26, 37 and 37ª, respectively; while a small gear 131 on the lower end of shaft 27ª drives the feed-roll 26ª.

The pith-cutters 28 and 28ª, being required to rotate at a high rate of speed, are preferably, and as herein shown, independently driven; the means for such purpose consisting of pulleys 132 and 133 fast on the lower ends of the shafts 32 and 32ª of said cutters, engaged by independent driving belts 134 and 135 (Figs. 3, 5 and 7), driven from pulleys 136 and 137 on the overhead shaft 113, said belts being guided around a pair of end pulleys 138 and 139 and an intermediate double grooved pulley 140, all suitably mounted on a pair of standards 141 secured to the table 1.

Referring next to the means for driving the series of winders, 142 and 143 designate a pair of double grooved pulleys fast on the main shaft 109, the former of which, by belts 144 and 145, and suitable idler guide-pulleys 146, drive the pulleys 83 of the two intermediate winders; while the latter, through belts 147 and 148 (Fig. 1) and suitable idler guide-pulleys 149, drive the corresponding pulleys of the two outside or lateral winders.

For the purposes of driving the several sets of feed-rolls 88 and 89 which draw the wrapped strips through the winders, I provide on the lower end of the shaft 53 of the fibering mechanism, beneath the table 1, a master-gear 150 (Fig. 6) which, through the train of gears indicated by dotted lines in Fig. 5, drives the several shafts 90 of the feed-rolls 88, this train of gearing being as follows: On one side the master-gear 150 meshes with an idle-gear 151 which, in turn, meshes with and drives an outside and intermediate gear 152 and 153 on the lower ends of the two roll-shafts 90 on one side of the machine. On the other side the master-gear similarly drives an idler 154 which, in turn, meshes with and drives an outside and intermediate gear 155 and 156, respectively, on the lower ends of the roll-shafts 90 on the opposite side of the machine.

The reel-shaft 99 is driven by an endless belt 157 engaging the pulley 100 and receiving its motion from a horizontal pulley 158 fast on the lower face of the master-gear 150, as clearly shown in Fig. 6; the two sections of said belt being guided around idler guide-pulleys 159 and 160, secured to the under side of the table 1, as clearly shown in Fig. 5.

The shaft 113 of the overhead driving mechanism (which latter it will be understood does not constitute any essential part of the present machine, but is intended merely to illustrate a convenient means for applying power thereto) is provided, as shown in Fig. 7, with fast and loose pulleys 161 and 162, respectively, engaged by a belt 163 driven from any suitable source of power, an ordinary belt-shifter 164, operated by a depending lever 165, being employed to shift the belt for starting and stopping the machine.

In some cases it is found desirable, although not necessary, to provide a continuous central core for the several wound strips produced by the machine. For this purpose I have shown the present machine as equipped with a thread-guide 166 consisting of a horizontally-extending bar on the upper end of and preferably integral with a standard 167 secured on the front end of the table or platform 1, said bar having a series of slotted thread-guides 168 (Fig. 4) to receive and support core-threads 169 led therethrough from a series of spools (not shown) which may be mounted on any suitable support sufficiently in advance of the machine-frame to be out of the way of its operating parts. From the guide 166 the threads extend above the operating parts of the machine directly into the mouths of the several winder-tubes 86, centrally of the fibered stock. The employment of such core-threads affords greater tensional strength to the wound or wrapped strips in cases where special tensional strength is requisite or desired.

The operation of the machine has been to a considerable extent already indicated, but may be briefly recapitulated as follows: With the quill-depressing device in its lowest position, in which it rests upon the lateral extension of the bed 3, the stripped quills are stacked up in the quill-guide, after which the weighted quill-depressing device is elevated until the fingers 14 overlie the topmost quill, as shown in Fig. 2. Power being then applied by shifting the main driving-belt 163 to the tight pulley, motion is communicated to the movable parts of the various coöperating mechanisms of the machine. Thereupon the quill feed-rolls 19 and 19ª seize upon the lowest quill and, clamping it frictionally between their grooved peripheries, advance the point of the quill through the throat 11 into the nip of the auxiliary feed rolls 21 and 21ª, whence the point of the quill emerges upon the vertical cutting edge of the splitting knife 23. From the latter one-half of the quill passes on to the right between the feed rolls 21 and 26, and thence past the cutter 28, with its pith side engaged by the teeth of the latter, whereby the quill is thoroughly denuded of the pith, the latter being drawn off as fast as it is separated through the suction-tube 50, the cleaned quill passing thence through the channel-guide 33 into the nip of the feed-rolls 34 and 34ª. The other half of the split quill passes to the left, through the feed rolls 21ª and 26ª, past the pith-cutter 28ª, where it is denuded of the pith, the latter being drawn away through the suction-branch 52. Thence the cleaned section turns back on itself in the channel-guide 36, being thence further advanced by the auxiliary feed-rolls 37 and 37ª into and through the channel-guide 39, whence it emerges alongside of but approximately half its length in the rear of its companion half-section of the shell. Meanwhile the quill feed-rolls 19 and 19ª have seized upon the next lowermost quill and advanced the latter in close order through the same mechanism. In this manner the cleaned quill stock is passed through the feed-rolls 34 and 34ª in successive half-shell sections, so disposed that the joints on one side are brought substantially opposite the longitudinal center of the half-shell sections on the other, thereby producing such an overlapping of the joints as produces a substantial continuity in the stock considered as a whole, and prevents any breaks or gaps therein. From the feed rolls 34 34ª the reunited sections of the quills pass side by side through the guide 42 into and through the fibering or slivering mechanism, wherein the shells are cut longitudinally into a series of comparatively fine fibers or slivers, which, being forced endwise upon the vertical dividing edges of the lower and upper partition-plates as well as upon the horizontal dividing edge formed by the pointed central portion of the bridge of the upper partition-plate, is divided into four approximately equal sections, which are thence directed off through the angularly disposed guides of said partition-plates into and through the throats or mouths of the tubular guides of the winders. Immediately upon their entrance to said guides the winding or wrapping threads are wound about the stock, thereby securing the fibers or slivers together and insuring the continuity of the several cords. From the winders the cords pass through the drawing-rolls 88—89, which latter thereupon become effective to assist the previously acting series of feed-rolls in passing the stock along through the successive mechanisms. From the drawing rolls 88—89 the wound cords, as fast as formed, are carried over the spooling-guides 107 and then attached to the hubs of the spools, whereupon the frictional rotation of the latter serves to wind the finished cords thereupon with sufficient tensional effect to prevent slack between the spools and the drawing-rolls and lay the cords upon the spools as fast as they are delivered by the machine. The pull of the spools is regulable by proper adjustment of the collars 102 which determine the tension of the springs 104 on the spooling-shaft and consequently determine the degree of rotative frictional effect imparted to the spools by the collars 101. Practically all of the several mechanisms which operate upon the stock are provided with means, as already described, whereby their speed and intimacy of contact with the stock may be nicely regulated and adjusted, this being important, since the relative movements of the several mechanism must be accurately timed and slip between the stock and the parts engaging the same avoided in order to prevent both bunching or undue enlargement on the one hand and attenuation or interruption in the continuity of the stock on the other, and maintain the finished product of substantially uniform caliber.

It is evident that the machine as hereinbefore described and illustrated in the drawings might be considerably modified in respect to the construction and relative disposition of the several operating parts, as well as by the substitution of mechanical equivalents, without departing from the spirit and principle of the invention or sacrificing any of the advantages thereof. Hence I do not limit the invention to the particular mechanism shown and described, except to the extent indicated in specific claims.

Having thus described my invention, what I claim as new and desire to secure by Letters Patent, is:

1. In a quill-treating machine, the combination with means for supporting and guiding a stack of quills, of means for withdrawing the quills from the stack successively and advancing them to the action of the quill-treating mechanism, substantially as described.

2. In a quill-treating machine, the combination with means for supporting and guiding a stack of superposed quills, of means for successively withdrawing the lowermost quill of the stack and advancing it to the action of the quill-treating mechanism, substantially as described.

3. In a quill-treating machine, the combination with means for supporting and guiding a stack of superposed quills, of means for successively withdrawing the lowermost quill of the stack and advancing it to the action of the quill-treating mechanism, and means for depressing the superposed quills as fast as the lowermost quill is withdrawn, substantially as described.

4. In a quill treating machine, the combination with means for supporting and guiding a stack of superposed quills, of a pair of feed-rolls disposed on opposite sides of the stack in a plane transverse thereto, the peripheries of said rolls being provided with means for gripping and advancing between them the quills in successive order, substantially as described.

5. In a quill-treating machine, the combination with means for supporting and guiding a stack of superposed quills, of a pair of feed-rolls disposed on opposite sides of the stack, the peripheries of said rolls being provided with means for gripping and advancing between them the quills in successive order, substantially as described.

6. In a quill-treating machine, the combination with means for supporting and guiding a stack of superposed quills, of a pair of feed-rolls arranged in the plane of and on opposite sides of the lowermost quill, the peripheries of said rolls being provided with means for gripping and advancing between them one quill at each complete rotation thereof, substantially as described.

7. In a quill-treating machine, the combination with means for supporting and guiding a stack of superposed quills, of a pair of feed-rolls disposed on opposite sides of the stack in a plane transverse thereto, the peripheries of said rolls being provided with flattened portions arranged to come opposite each other to receive the forward end of a quill at each rotation of said rolls, substantially as described.

8. In a quill-treating machine, the combination with means for supporting and guiding a stack of superposed quills, of a pair of feed-rolls arranged in the plane of and on opposite sides of the lowermost quill, the peripheries of said rolls being provided with flattened portions arranged to come opposite each other and receive the forward end of the lowermost quill at each rotation of said rolls, substantially as described.

9. In a quill-treating machine, the combination with means for supporting and guiding a stack of superposed quills, of means for withdrawing the quills, one at a time, from the stack and advancing them to the action of the quill-treating mechanism, and a weighted quill-depressing device exerting a constant downward pressure upon the stack, substantially as described.

10. In a quill-treating machine, the combination with means for supporting and guiding a stack of superimposed quills, of means for successively withdrawing the lowermost quill of the stack and advancing it to the action of the quill-treating mechanism, and a weighted quill-depressing device exerting a constant downward pressure upon the stack, substantially as described.

11. In a quill-treating machine, the combination with means for supporting and guiding a stack of superimposed quills, of a pair of feed-rolls arranged to grip and withdraw the quills, one at a time, from the stack, and a quill-splitting knife disposed beyond and substantially tangential to the adjacent peripheral portions of said rolls, substantially as described.

12. In a quill-treating machine, the combination with means for supporting and guiding a stack of superposed quills, of a pair of horizontal feed-rolls arranged to grip and withdraw successively the lowermost quills of the stack, and a vertical quill-splitting knife disposed beyond and substantially tangential to the adjacent peripheral portions of said rolls, substantially as described.

13. In a quill-treating machine, the combination with a quill-splitting knife and means for advancing the quills end foremost onto the edge of said knife, of pith-cutters disposed on opposite sides of said knife, respectively, and means for advancing and guiding the split sections into the fields of action of said pith cutters, substantially as described.

14. In a quill-treating machine, the combination with a quill-splitting knife and means for advancing the quills end foremost onto the edge of said knife, of pith-cutters disposed on opposite sides of said knife, respectively, and feed-rolls between which the split sections are advanced and guided into the fields of action of said pith-cutters, substantially as described.

15. In a quill-treating machine, the combination with a quill-splitting knife and means for advancing the quills end foremost onto the edge of said knife, of pith-cutters disposed on opposite sides of said knife, respectively, means for advancing and guiding the split sections into the fields of action of said pith-cutters, and suction-draft passages communicating with the fields of action of said pith cutters, substantially as described.

16. In a quill-treating machine, the combination with a quill-splitting knife and means for advancing the quills end foremost onto the edge of said knife, of rotary pith-cutters disposed on opposite sides of said knife, respectively, and means for advancing and guiding the split sections over the peripheries of said rotary cutters, substantially as described.

17. In a quill-treating machine, the combination with a quill-splitting knife and means for advancing the quills end foremost onto the edge of said knife, of rotary pith-cutters disposed on opposite sides of said knife, respectively, feed-rolls between which the split sections are advanced and guided over the peripheries of said rotary cutters, and suction draft passages communicating with the fields of action of said pith-cutters, substantially as described.

18. In a quill-treating machine, the combination with a quill-splitting knife and means for advancing the quills end foremost onto the edge of said knife, of pith-cutters disposed on opposite sides of said knife, respectively, means for advancing and guiding the split sections into the fields of action of said pith-cutters, and means located beyond the latter whereby the split and cleaned sections are subsequently brought side by side, substantially as described.

19. In a quill-treating machine, the combination with a quill-splitting knife and means for advancing the quills end foremost onto the edge of said knife, of pith-cutters disposed on opposite sides of said knife, respectively, means for advancing and guiding the split sections into the fields of action of said pith cutters, means located beyond the latter whereby the split and cleaned sections are subsequently brought side by side, and fibering mechanism serving to split the quill-sections into a bundle of fibers, substantially as described.

20. In a quill-treating machine, the combination with a quill-splitting knife and means for advancing the quills end foremost onto the edge of said knife, of pith cutters disposed on opposite sides of said knife, respectively, means for advancing and guiding the split sections into the fields of action of said pith-cutters, alternately arranged channel-guides and feed-rolls serving to advance the split and cleaned sections from said pith-cutters to a position in which they lie side by side, and fibering mechanism serving to split or sliver the quill-sections into a bundle of fibers, substantially as described.

21. In a quill-treating machine, the combination with means for splitting the quills and means for cleaning the split sections and subsequently guiding and advancing them to a position in which the cleaned sections lie side by side, of a fibering mechanism serving to split or sliver the quill sections into a mass of fibers, and means serving to divide said mass longitudinally into a plurality of small bundles, substantially as described.

22. In a quill-treating machine, the combination with means for splitting the quills, and means for cleaning the split sections and subsequently guiding and advancing them to a position in which the cleaned sections lie side by side, of a fibering mechanism serving to split or sliver the quill sections into a mass of fibers, and angularly disposed channel-guides located opposite the discharge of said fibering mechanism serving to divide said mass longitudinally into a plurality of small bundles and conduct the latter away separately, substantially as described.

23. In a quill-treating machine, the combination with means for fibering or slivering the quills consisting of two series of peripherally overlapping rotatable cutter-disks engaging the quills longitudinally thereof and reducing them to a mass of fibers, of partition-plates located opposite the discharge of said fibering mechanism and serving to divide said mass longitudinally into a plurality of small bundles and conduct the latter away at different relative angles, substantially as described.

24. In a quill-treating machine, the combination with means for fibering or slivering the quills, consisting of two series of peripherally overlapping rotatable cutter-disks engaging the quills longitudinally thereof and reducing them to a mass of fibers, of partition plates located opposite the discharge of said fibering mechanism and serving to divide said mass both vertically and horizontally into a plurality of small bundles and conduct the latter away at different relative angles, substantially as described.

25. In a quill-treating machine, means for reducing the quills to a bundle of slivers or fibers, comprising two series of superposed peripherally overlapping rotatable cutter-disks engaging the quills longitudinally thereof, in combination with stationary washers disposed between the adjacent cutter-disks of each series and serving to both space and clean the latter, substantially as described.

26. In a quill-treating machine, means for reducing the quills to a mass of slivers or fibers and subsequently dividing the latter, consisting of two series of alternately disposed rotatable cutter-disks and stationary washers, in combination with stationary partition-plates disposed opposite the discharge point of said cutters, said partition-plates comprising means for dividing the mass longitudinally into a series of small bundles, and means for conducting the latter away in different directions, substantially as described.

27. In a quill-treating machine, means for reducing the quills to a mass of slivers or fibers and subsequently dividing the latter, consisting of two series of alternately disposed rotatable cutter-disks and stationary washers, in combination with a pair of stationary partition-plates disposed opposite the discharge point of said cutters, the upper of said partition-plates serving to divide said mass horizontally and the upper half thereof vertically, and the lower of said partition plates serving to divide the lower half of the mass vertically, substantially as described.

28. In a quill-treating machine, the combination with a fibering mechanism and means for feeding a quill section thereinto, of means for dividing the fibered stock into a plurality of separate bundles as said stock emerges from the fibering mechanism, substantially as described.

29. In a quill-treating machine, the combination with means for feeding into the machine an entire quill, of means for splitting the same longitudinally, means for cleaning the split sections of pith, a fibering mechanism, means for gripping and carrying said sections into the latter, and means for dividing the fibered mass into a plurality of separate bundles as said stock emerges from the fibering mechanism, substantially as described.

30. In a quill-treating machine, the combination with means for feeding into the machine an entire quill, of means for splitting the same longitudinally, means for cleaning the split sections of pith, a fibering mechanism, and means for gripping and carrying said sections in endwise overlapping relation into said fibering mechanism, substantially as described.

31. In a quill-treating machine, the combination with means for feeding into the machine an entire quill, of means for splitting the same longitudinally, means for cleaning the split sections of pith, a fibering mechanism, means for gripping and carrying said sections in endwise overlapping relations into said fibering mechanism, and means for dividing the fibered mass into a plurality of separate bundles as said stock emerges from the fibering mechanism, substantially as described.

32. In a quill-treating machine, the combination with a quill-splitting device, means for feeding the quills successively to said quill-splitting device, rotary pith-cutters serving to clean the split sections, a fibering mechanism, and feeding devices between said pith cutters and fibering mechanism, of a driving means for said fibering mechanism, driving connections from the latter to the several feeding devices, and independent driving means for said pith cutters, substantially as described.

33. In a quill-treating machine, the combination with means for supporting and guiding a stack of quills, of a pair of feed-rolls arranged to engage the quills one at a time to withdraw the quills from the stack successively and advance them to the action of the quill-treating mechanism, substantially as described.

34. In a quill-treating machine, the combination with means for supporting and guiding a stack of quills, of a pair of feed rolls arranged to engage and withdraw the quills from the stack successively and advance them to the action of the quill-treating mechanism, substantially as described.

In witness whereof, I have hereunto set my hand and seal in the presence of two witnesses.

WILLIAM WEBSTER. [L. S.]

Witnesses:
R. G. FISHER,
LULU GREENFIELD.